May 3, 1966     H. O. SCHJOLIN ETAL     3,249,189
TRANSMISSION CLUTCH CONTROL AND PUMP DRIVE MECHANISM
Filed Sept. 12, 1963     2 Sheets-Sheet 1

INVENTORS
Hans O. Schjolin
Francis O. Gadd &
Luther N. Kern
BY R. L. Spencer
ATTORNEY

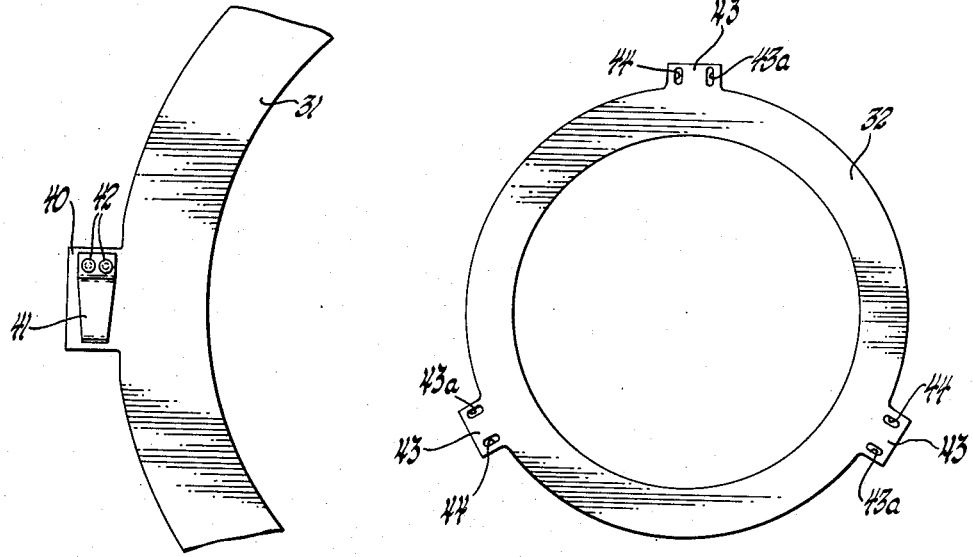
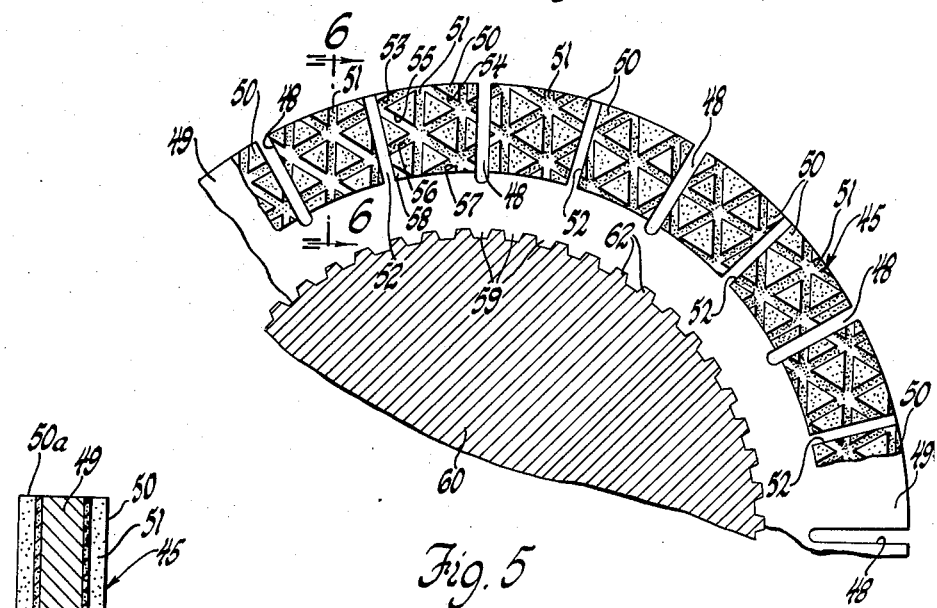

United States Patent Office

3,249,189
Patented May 3, 1966

3,249,189
TRANSMISSION CLUTCH CONTROL AND PUMP DRIVE MECHANISM
Hans O. Schjolin and Francis O. Gadd, Birmingham, and Luther N. Kern, Berkley, Mich., assignors to General Motors Corporation, Detroit, Mich., a corporation of Delaware
Filed Sept. 12, 1963, Ser. No. 308,479
10 Claims. (Cl. 192—69)

This invention relates to clutches and more particularly to an improved disc-type clutch structure and controls therefor. The improved clutch structure is particularly adapted for use in vehicles such as trucks and buses wherein frequent start-up from a stopped position and frequent shifting of gears is encountered. Such heavy duty operations normally encounter greater clutch wear for a given number of miles of vehicle travel than is true of automobiles. The improved disc clutch arrangement and controls results in long useful life both of the clutch discs themselves and of the axially movable clutch throwout or release mechanism.

An object of this invention is to provide a clutch arrangement incorporating driving and driven discs having high torque transmitting capacity and long useful life.

Another object of this invention is to provide a disc clutch having driving and driven discs wherein a driven clutch disc is disposed at each side of a subassembly of three individual thin driving clutch discs such that each of the driven discs contacts one of the spaced driving clutch discs of the subassembly when the clutch is engaged.

An additional object of this invention is to provide means forming with a driven clutch hub a chamber adapted to contain cooling fluid and supplied with fluid when the clutch is disengaged.

A further object of this invention is to provide in a clutch assembly of the type described, means for preventing drag of the driving and driven clutch discs and for insuring release of the presser plate when the clutch is released.

Still another object of this invention is to provide in a clutch housing, a pump directly driven by the vehicle engine for continuously supplying fluid to a chamber formed on a driven clutch hub irrespective of the condition of engagement or release of the clutch.

A particular object of this invention is to provide an improved clutch having a clutch housing, an engine driven flywheel, a driven shaft, a driven clutch hub flange connected for rotation with the driven shaft, driving and driven clutch discs adapted to be engaged and released, a chamber formed on the driven clutch hub for receiving fluid, a pump, means for controlling engagement and release of the clutch discs driven by the flywheel and continuously driving the pump to supply fluid to the chamber continuously irrespective of the condition of engagement or release of the clutch.

A more particular object of this invention is to provide a clutch control for controlling engagement and release of a clutch including an axially movable clutch release member supported on the clutch driven shaft and driven at engine speed so as to be rotatable at the speed of rotation of the clutch driven shaft at all times when the clutch is engaged.

Another object of this invention is to provide in a clutch having clutch discs, a presser plate and a Belleville spring, an axially movable member operatively connected to the Belleville spring for controlling engagement and release of the clutch, supported on the clutch power delivery shaft and driven at engine speed by the Belleville spring so that the axially movable member and the clutch driven shaft on which the axially movable member is supported rotate at the same speed when the clutch is engaged and rotate at different speeds only when the clutch is released.

A further object of this invention is to provide an improved clutch having engageable and releasable clutch discs wherein an oil receiving chamber is formed on the driven clutch hub and continuously supplied with fluid when the clutch is released and wherein a series of openings are provided in the driven clutch hub to continuously permit fluid to flow from the driven clutch hub chamber onto the discs for cooling and lubricating the same both when the clutch is engaged and when the clutch is released.

A more particular object of this invention is to provide a fluid receiving chamber on the drum clutch hub, means for continuously supplying fluid to the chamber to retain fluid in the chamber when the clutch is released so that a copious supply of fluid for cooling purposes is available to be thrown outwardly on the clutch discs during the interval of clutch engagement.

These and other objects and advantages of this invention will be apparent from the following specification and claims, taken in conjunction with the accompanying drawings in which:

FIGURE 3 is a side view of an assembly of a clutch wear plate and a release spring.

FIGURE 4 is a side view of a spacer plate.

FIGURE 5 is a side view of a driven clutch plate.

FIGURE 6 is a sectional view taken along the line 6—6 of FIGURE 5.

Figure 1:
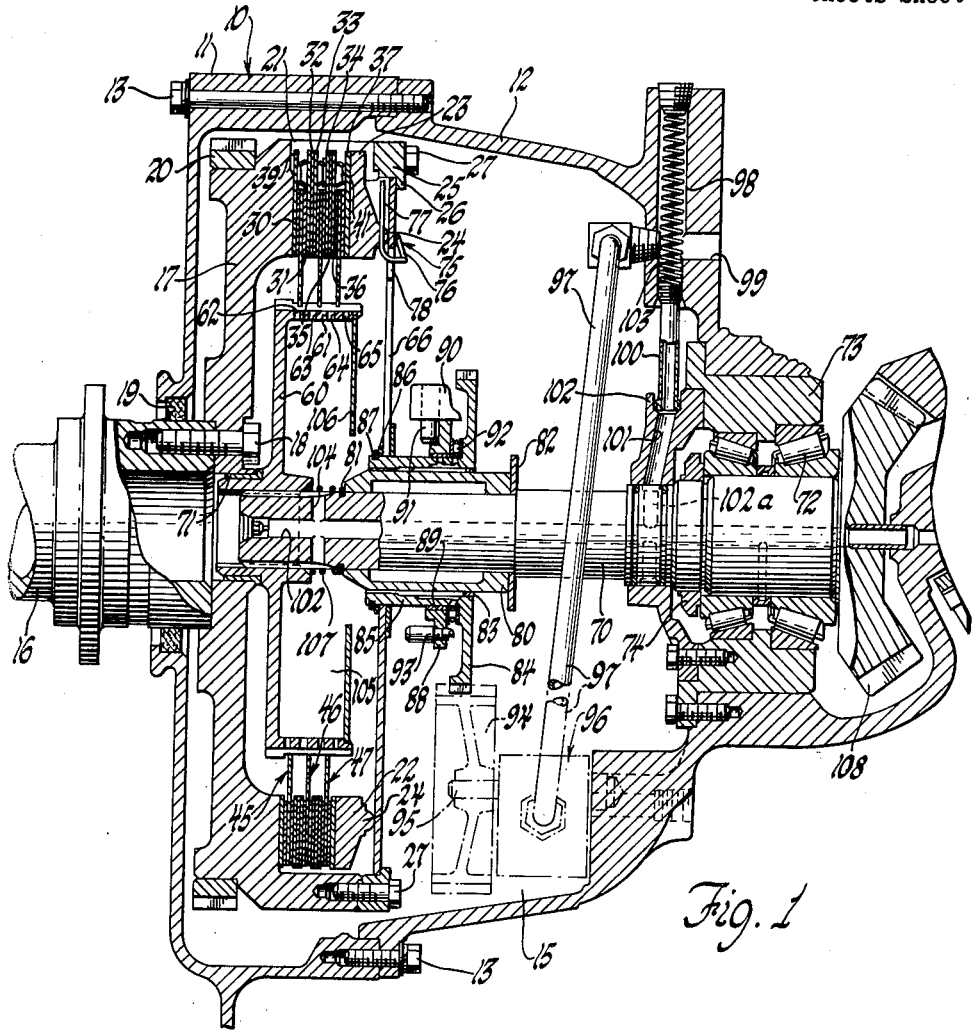
FIGURE 1 is a cross section of a clutch assembly constructed in accordance with the principles of this invention.

Referring to FIGURE 1 there is shown a clutch assembly constructed in accordance with the principles of this invention including a clutch housing indicated generally at 10 formed of two detachable clutch housing sections 11 and 12 retained in assembled relationship by means of suitable bolts 13, the two housing sections 11 and 12 forming a chamber 15 therein.

An engine driven power input shaft 16 extends into chamber 15 and has a flywheel 17 bolted thereon by bolts 18. An oil seal 19 prevents fluid leakage from chamber 15 past shaft 16. Flywheel 17 is provided with ring gear 20 for engagement by a conventional engine starter (not shown) and a flat-axially extending surface 21 adapted to contact upstanding lugs formed on driving clutch discs and an upstanding lug 23 formed on an annular presser plate 22. An annular cover plate 25 having a depending annular lip 26 is bolted to one end of the flywheel by bolts 27.

Figure 2:
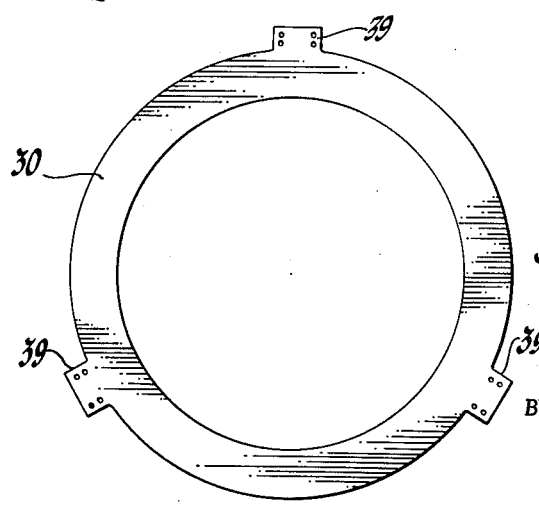
FIGURE 2 is a side view of a clutch wear plate.

A drive disc clutch assembly is shown as comprising eight discs 30, 31, 32, 33, 34, 35, 36 and 37 mounted on flywheel 17 for rotation therewith and axially movable with respect to the flywheel. Discs 30 and 37 are similar and accordingly only disc 30 is shown in detail in FIGURE 2. Referring to FIGURE 2, clutch disc 30, which comprises a wear plate, has provided thereon three upstanding lugs 39, each lug 39 contacting one of three similar flat surfaces 21 formed on flywheel 17. Wear plate 30 is disposed between flywheel 17 and a driven clutch disc 45. Mounted on flywheel 17 at the opposite side of driven clutch disc 45 from wear plate 30 is a subassembly of three thin discs 31, 32 and 33. Discs 31 and 33 comprise clutch wear plates, whereas disc 32 constitutes a spacer plate disposed between plates 31 and 33. Wear plates 31 and 33 are of similar construction, the plate 31 being illustrated in FIGURE 3. Plate 31 is provided with three lugs 40 adapted to contact surfaces 21 of FIGURE 1, there being a spring 41 riveted to each lug 40 by rivets 42. Spacer plate 32 best shown in FIGURE 4, is provided with three upstanding lugs 43, each lug having a pair of elongated clearance openings 43a and 44 formed therein. When assembled, clearance openings 43a and 44 receive the heads of rivets 42. Wear plate 33 is similar to wear plate 31 in that it has springs similar to springs 41 of FIGURE 3 riveted thereon.

The second subassembly of three discs includes clutch wear plates 34 and 36 with a spacer disc 35 disposed therebetween. Wear plate 34 is similar to wear plate 30 in that it has no spring attached thereto. Spacer plate 35 is similar to spacer plate 32. Wear plate 36 is similar to wear plates 31 and 33 in that it has a leaf spring similar to leaf spring 41 of FIGURE 3 riveted to each of its lugs. Wear plate 37 is of similar construction to wear plates 30 and 34 in that no springs are attached to its lugs.

Driven clutch discs 45, 46 and 47 are disposed between wear plates 30 and 31, between wear plates 33 and 34, and between wear plates 36 and 37, each driven clutch disc being of similar construction and splined for axial motion on an axially extending flange 61 of a clutch hub 60.

As shown in FIGURES 5 and 6, clutch plate 45 comprises a disc having twelve equally spaced slots 48 extending radially inwardly from the perimeter of the disc to form twelve spaced metallic segments 49 in the contact area of the disc. Clutch facings 50 and 50a of similar configuration are bonded to the opposite sides of each of the metallic segments, there being two adjacent spaced facings on each metallic segment. The facings are formed to provide a series of oil conducting channels 51 to permit oil flow particularly during the interval of clutch engagement. Slots 48, channels 51 and the space 52 between the adjacent ends of facings 50 permit the oil to flow directly radially outwardly. Channels 53, 54, 55, 56, 57 and 58 conduct oil across the facings at an angle to the radial slots 48 and channels 52, in a direction toward the outer perimeter of the facings, and are in communication with the radial slots 48 and channel spaces 52. Splines 59 on disc 45 cooperate with splines 62 formed on flange 61 of a clutch hub 60 on FIGURE 1.

A clutch driven shaft 70 is piloted at one end thereof in flywheel 17 by means of a bushing 71 and is supported in housing section 12 by means of a suitable bearing 72 supported in housing 12 by a bearing retainer 73. A nut 74 is screw threaded on shaft 70 to maintain the bearing in its proper position on shaft 70.

A Belleville clutch spring 66 provides conventional clutch operating means and is carried by cover plate 25 and retained thereon by lip 26 of plate 25. Spring 66 contacts an axially extending boss 24 on presser plate 22 and normally biases the presser plate to engage the clutch. Lip 26 serves as the reaction point for spring 66. Presser plate 22 is connected to Belleville spring 66 by a spring clip 75 having a base 76 contacting one side of spring 66 and a stem 77 positioned through an opening 78 in spring 66 and an opening in boss 24 of presser plate 22. A pump drive gear adapter 80 is retained on driven shaft 70 by means of a snap ring 81 and a washer 82. A bushing 83 supports a pump drive gear 84 on adapter 80. Gear 84 is formed on and part of a clutch throwout sleeve 85 supported on bushing 83 for axial motion with respect to shaft 70. A main spring thrust ring 86 fixed on sleeve 85 by a retaining ring 87 contacts the inner end of Belleville spring 66 to move the inner end of the spring in response to axial motion of sleeve 85. A thrust ring 88 supported upon a bushing 89 on clutch throwout sleeve 85 may be moved axially by a clutch throwout fork 90 and a pin 91. A clutch throwout thrust bearing 92 is disposed between thrust ring 88 and the hub of pump drive gear 84. A pin 93 on clutch throwout thrust ring 88 cooperates with pin 91 on the clutch throwout fork to prevent rotation of thrust ring 88. It will be noted that the range of axial motion of clutch throwout sleeve 85 and pump drive gear 84 is limited by pump drive gear stop washer 82 which extends upwardly into the path of travel of sleeve 85.

Gear 84 mates with and is axially movable upon a pump drive gear 94 fixed to a shaft 95 of a conventional gear pump 96. Belleville spring 66 is driven by flywheel 17 and drives clutch throwout sleeve 85 and gear 84. It will be apparent that pump 96 is continuously driven whenever the flywheel is rotated irrespective of the condition of engagement or release of the clutch. Pump 96 draws oil from the bottom of chamber 15 and delivers oil under pressure to a passage 98 in clutch housing through a tube 97. Oil under pressure may be delivered to a transmission (not shown) driven by gear 108 through a passage 99 for control or lubrication purposes. Passage 98 in housing 12 is connected to a passage 101 in a guide 102 through an oil transfer tube 100. A spring 103 biases tube 100 into the guide 102 to prevent leakage of fluid pressure at the juncture of tube 100 and passage 101. Passage 101 delivers fluid under pressure to a passage 102 in shaft 70 through cross passages 102a. Passage 102 may supply oil under pressure to the transmission (not shown) and through cross passages 104 to reservoir 105 on the driven clutch hub 60.

Referring again to the clutch structure, presser plate 22 is connected to Belleville spring 66 by a retaining spring clip 75 having a clip base 76 contacting the Belleville spring and a stem 77 which is inserted through opening 78 in spring 66 and boss 24 of presser plate 22. The clip is held in its assembled position due to its spring action once it is inserted through the opening in the presser plate. It will be apparent that the presser plate will be positively moved out of contact with clutch wear plate 37 by action of spring clips 75 when the Belleville spring is moved to its clutch release position. A coil spring 107 seated upon snap ring 81 biases clutch hub 60 to the left as viewed in the drawing against bushing 71.

A radially inwardly extending disc 106 carried by flange 61 forms with flange 61 and clutch hub 60 a reservoir 105. Openings 62, 63, 64, and 65 in flange 61 permit fluid flow from reservoir 105 to the drive and driven clutch discs. Shaft 70 drives a gear 108 which may deliver power to a transmission, not shown.

In operation, Belleville spring 66 normally biases presser plate 22 to engage the clutch with lip 26 of cover plate 25 serving as the reaction point for the spring. To release the clutch, fork 90 may be actuated through any conventional linkage by means of a conventional clutch pedal (not shown) to move sleeve 85 and gear 84 toward stop member 82. One of the important features of this invention is the structure whereby clutch throwout sleeve 85 and its support 80 are both driven at engine speed when the clutch is engaged. Due to this arrangement there is no relative rotation of the clutch throwout sleeve and its support during normal operation of the vehicle with the clutch engaged. It is only during clutch disengaged operation that relative rotation of sleeve 85 and its support 80 may occur. Since this condition of operation occurs only during a very small percentage of the useful life of the clutch, the clutch life is greatly extended over conventional clutch arrangements wherein the clutch throwout sleeve is supported on a nonrotatable support fixed to the clutch housing.

Another important feature of this invention is the provision of the fluid reservoir 105 formed on the driven clutch hub 60. It will be understood that pump 96 will be continuously driven and will supply fluid to reservoir 105 both when the clutch is engaged and released. This fluid will continuously be delivered to the clutch disc through passages 62, 63, 64 and 65 by gravity action when the clutch is disengaged and when the hub 60 is not rotating. The capacity of pump 96 is such as to be able to maintain a given level of fluid in reservoir 105 when the clutch is disengaged and the vehicle standing still, irrespective of the fact that fluid is continuously being delivered to the clutch discs through the openings in flange 61. As the clutch is initially engaged, there is therefore a reservoir of fluid readily available to provide a copious quantity of fluid for cooling and lubricating the clutch discs. During the interval of clutch engagement and during running with the clutch engaged rotation of driven clutch hub 60 and reservoir 105 will throw the oil outwardly under action of centrifugal force to cool and lubricate the clutch discs. The combination of the sets of thin discs and reservoir 105 as described provides for a clutch having very high torque transmitting capacity in small space and a clutch having a long useful life, due particularly to the very effective cooling provided during the interval of clutch engagement.

A further important feature of this invention is the provision of the spring clips 75 and spring 41 which assure complete release of the discs and prevent clutch drag when the clutch is released. Spring clip 75 positively pulls presser plate 22 away from the clutch discs and the spring 41 center the drive clutch wear plates out of contact with the driven clutch plate friction surfaces. This not only prevents clutch drag but permits fluid from reservoir 105 to pass between the driven clutch plates and drive clutch plates when the vehicle is stopped and the clutch released.

The arrangement wherein the clutch throwout sleeve 85 is driven by Belleville spring 66 and mounted directly on power delivery shaft 70 so that both the throwout sleeve and the support on which it is mounted for axial movement rotate at the same speed whenever the clutch is engaged reduces wear and increases the useful life of the clutch throwout sleeve. The clutch is engaged during most of its useful life and is disengaged only during a small portion of its useful life. It will readily be understood, therefore, that relative rotation of the throwout sleeve and its support which occurs only when the clutch is disengaged will be had only during a minor part of the clutch life. It has been found that the arrangement disclosed including the two subassemblies of drive clutch discs with a spacer plate disposed between the wear plate of each subassembly, the end wear plates 30 and 37, the springs 41, the spring clip 75 between the Belleville spring and presser plate provide a clutch having very long useful life and particularly adapted for effective rapid cooling of the discs. Oil from reservoir 105 is effective between the two wear plates and spacer plate of each subassembly particularly during the interval of clutch engagement when it is most needed. Since the wear plates and spacer plates disposed therebetween are formed of thin stampings the oil is particularly effective to cool the discs.

It will be understood that the member 80 which is shown as a pump drive gear adapted rotates with output shaft 70 and may constitute a part of shaft 70 rather than a separate member as shown.

We claim:

1. In a clutch, a housing, a power input shaft, a flywheel driven by said shaft, a power delivery shaft, a driven clutch hub rotatable with said delivery shaft, engageable and releasable driving and driven clutch discs on said flywheel and clutch hub, respectively, a presser plate, clutch operating means driven by said flywheel for moving said presser plate to engage and release said clutch discs, a clutch control sleeve operatively connected to said clutch operating means and supported for rotation solely on said delivery shaft and driven by said flywheel, said control sleeve and said delivery shaft being rotated at the same speed of rotation when clutch is engaged, and means for moving said control sleeve to release said clutch.

2. In a clutch, a housing, a power input shaft, a flywheel driven by said shaft, a power delivery shaft, a driven clutch hub fixed to said power delivery shaft for driving said shaft, engageable clutch discs on said flywheel and clutch hub, respectively, a presser plate driven by said flywheel, a Belleville spring driven by said flywheel and normally effective to move said presser plate to engage said clutch, an axially movable control member mounted on said power delivery shaft and driven by said Belleville spring, an opening through said Belleville spring, an opening through said presser plate, means for connecting said presser plate to said Belleville spring comprising a spring clip having a base on said Belleville spring and a stem inserted through said openings, and means for moving said axially movable control member for releasing said clutch.

3. In a clutch, a housing, a power input shaft, a flywheel driven by said shaft, a power delivery shaft, a driven clutch hub for driving said power delivery shaft, a series of discs supported on said flywheel for axial movement with respect thereto, said discs including first and second spaced wear plates and first and second subassemblies of discs, each of said subassemblies including a pair of spaced wear plates supported directly on said flywheel and a spacer plate disposed between said wear plates, a presser plate axially movable with respect to said flywheel, first, second and third driven clutch discs supported upon said driven clutch hub and axially movable with respect to said hub, said first driven clutch disc being disposed between said first mentioned wear plate and one of the wear plates of said first subassembly, said second driven disc being disposed between a second wear plate of said first subassembly and a first wear plate of said second subassembly, said third driven disc being disposed between a second wear plate of said second subassembly and said second of said spaced wear plates, and means for moving said presser plate on said flywheel for alternately engaging and releasing said clutch.

4. In a clutch, a housing, a power input shaft, a flywheel driven by said shaft, a power delivery shaft, a driven clutch hub for driving said power delivery shaft, a series of discs supported on said flywheel for axial movement with respect thereto, said discs including first and second spaced wear plates and first and second subassemblies of discs, each of said subassemblies including a pair of spaced wear plates supported solely on said flywheel and a spacer plate disposed between said wear plates said wear plates being arranged for disassembly from said spacer plates, a presser plate axially movable with respect to said flywheel, first second and third driven clutch discs supported upon said driven clutch hub and axially movable with respect to said hub, said first driven clutch disc being disposed between said first mentioned wear plate and one of the wear plates of said first subassembly, said second driven disc being disposed between a second wear plate of said first subassembly and a first wear plate of said second subassembly, said third driven disc being disposed between a second wear plate of said second subassembly and said second of said spaced wear plates, a Belleville spring driven by said flywheel normally effective to move said presser plate to engage said clutch, a clutch throwout sleeve driven by said Belleville spring and supported upon said power delivery shaft for rotation at the speed of rotation of said output shaft when said clutch is engaged, and means for moving said sleeve with respect to said driven shaft of release said clutch.

5. In a clutch, a housing forming a chamber, a power input shaft, a flywheel disposed in said chamber and driven by said shaft, a power delivery shaft, a driven clutch hub for driving said driven shaft, an axially extending flange on said driven clutch hub, a series of axially spaced openings in said driven clutch hub flange, a disc on said flange forming with said driven clutch hub and said flange a reservoir adapted to receive fluid, engageable and releasable clutch discs on said flywheel and clutch hub, respectively, a presser plate driven by said flywheel, a Belleville spring driven by said flywheel and normally effective to engage said clutch discs, a clutch throwout sleeve supported only upon said power delivery shaft for axial movement with respect thereto and driven by said Belleville spring, said clutch throwout sleeve and said power delivery shaft always being rotated at the same speed of rotation when said clutch is engaged, a pump drive gear driven by said clutch throwout sleeve, a pump driven by said drive gear, passage means connecting said pump to said reservoir to supply fluid to said reservoir under all operating conditions of said clutch, and means for moving said clutch throwout speed axially on said power delivery shaft for releasing said clutch.

6. In a clutch, a housing forming a chamber, a power input shaft, a flywheel rotatable with said shaft, a power delivery shaft, a driven clutch hub splined to said power delivery shaft, an assembly of driving discs driven by said flywheel and axially movable with respect to said flywheel, said driving discs including first and second spaced wear plates and first and second spaced subassemblies of discs, each of said subassemblies including three discs comprising two spaced wear plates with a separator plate disposed between the wear plates of each subassembly, respectively, said wear plates being driven solely by said flywheel and being capable of disassembly from said separator plates, a presser plate axially movable with respect to said flywheel and driven by said flywheel, first, second and third driven clutch discs splined to said driven clutch hub, said first-mentioned wear plate being disposed adjacent said flywheel, said second mentioned wear plate being disposed adjacent said presser plate, said first driven clutch disc being disposed between said first-mentioned wear plate and one wear plate of said first subassembly, a spring disposed between said first-mentioned wear plate and said first wear plate of said first subassembly for separating said first subassembly from said first driven clutch disc when said clutch is released, said second driven clutch disc being disposed between adjacent pairs of wear plates on said first and second subassemblies, respectively, a spring disposed between adjacent pairs of wear plates of said first and second subassemblies for separating said wear plates from said second driven disc when said clutch is released, said third driven disc being disposed between said second-mentioned wear plate and a second wear plate of said second subassembly, a spring disposed between said second-mentioned wear plate and a wear plate of said second subassembly for separating said wear plates from said third driven disc when said clutch is released, a Belleville spring driven by said flywheel normally effective to move said presser plate to engage said clutch, means connecting said presser plate to said Belleville spring for moving said presser plate when said Belleville spring is moved to release said clutch, a clutch throwout sleeve supported solely upon said delivery shaft driven by said Belleville spring such that said throwout sleeve and said delivery shaft always rotate at the same speed when said clutch is engaged, and means for moving said clutch throwout sleeve on said delivery shaft to release said clutch.

7. A clutch as claimed in claim 6 including a disc supported on said driven clutch forming with said hub a reservoir adapted to receive fluid, passages in the hub for permitting fluid to flow from said reservoir to said clutch discs, a pump drive gear driven by said clutch throwout sleeve, a pump driven by said drive gear, and passage means connecting the discharge side of said pump to said reservoir, said pump being effective to continuously supply fluid to said reservoir irrespective of the condition of engagement or release of said clutch.

8. The invention defined in claim 1 and fluid pump means driven by said control sleeve.

9. The invention defined in claim 1 and said clutch control sleeve being driven by said clutch operating means.

10. The invention defined in claim 9 and a fluid pump driven by said control sleeve.

References Cited by the Examiner
UNITED STATES PATENTS

| | | | |
|---|---|---|---|
| 1,172,502 | 2/1916 | Tone | 192—89 X |
| 1,560,267 | 11/1925 | Lippincott | 192—113.2 X |
| 2,381,941 | 8/1945 | Wellman et al. | 192—113 X |
| 2,385,517 | 9/1945 | Hunt | 192—69 |
| 3,017,006 | 1/1962 | Dence et al. | 192—113.2 |
| 3,073,424 | 1/1963 | Russell | 192—113.2 |
| 3,094,194 | 6/1963 | Kershner | 192—113.2 X |
| 3,104,746 | 9/1963 | Gadd et al. | 192—113.2 |

FOREIGN PATENTS 914,220  12/1962  Great Britain.

DON A. WAITE, *Primary Examiner.*

DAVID J. WILLIAMOWSKY, *Examiner.*